United States Patent
Ebeling

(10) Patent No.: US 6,209,140 B1
(45) Date of Patent: Apr. 3, 2001

(54) BANDANNA AND ANIMAL COLLAR COMBINATION AND METHOD OF MANUFACTURE

(76) Inventor: Lorraine A. Ebeling, 2024 Lexington Pkwy., Niskayuna, NY (US) 12309

(*) Notice: Subject to any disclaimer, the term of this patent is extended or adjusted under 35 U.S.C. 154(b) by 0 days.

(21) Appl. No.: 09/286,954

(22) Filed: Apr. 6, 1999

(51) Int. Cl.$^7$ .................................................. A01K 27/00
(52) U.S. Cl. ................................................. 2/207; 119/792
(58) Field of Search ........................ 119/106, 109, 119/792, 793, 850, 861; D2/500, 605; 2/206, 207, 171, 172, 91, 129

(56) References Cited

U.S. PATENT DOCUMENTS

| | | |
|---|---|---|
| D. 381,786 * | 8/1997 | Arakawa ............................ D2/605 |
| 4,492,242 * | 1/1985 | Dalton .................................. 132/53 |
| 5,025,508 | 6/1991 | Duncan . |
| 5,058,211 | 10/1991 | Hanks . |
| 5,233,942 | 8/1993 | Cooper et al. . |
| 5,381,559 | 1/1995 | Wakefield, III . |
| 5,414,869 | 5/1995 | Thomson . |
| 5,465,689 * | 11/1995 | Winder ................................ 119/861 |
| 5,467,743 | 11/1995 | Doose . |
| 5,503,114 | 4/1996 | Castagna . |
| 5,608,914 | 3/1997 | Keesler . |
| 5,711,255 * | 1/1998 | rudolph .............................. 119/793 |
| 5,794,572 | 8/1998 | Saunders et al. . |
| 5,867,833 | 2/1999 | LeDonne . |

* cited by examiner

Primary Examiner—John J. Calvert
Assistant Examiner—Alissa L. Hoey
(74) Attorney, Agent, or Firm—Jay R. Yablon

(57) ABSTRACT

A triangular bandanna is slotted with at least two collar slots proximate one edge of the triangle. The edge proximate these slots, including the slots, is folded over upon the rest of the triangle and sewn or stitched into place. An animal collar is passed through the collar slots. When secured to an animal, the collar is enhanced in appearance by the bandanna, and the bandanna is securely affixed to the animal by the collar.

17 Claims, 2 Drawing Sheets

BANDANNA AND ANIMAL COLLAR COMBINATION AND METHOD OF MANUFACTURE

FIELD OF THE INVENTION

This invention relates generally to the field of animal collars, and particularly, to animal collars in combination with a bandanna-type garment.

BACKGROUND OF THE INVENTION

Animal collars are commonly used both to restrain and to identify the subject animal to which they are attached, such as a dog or a cat. As a restraint, a leash or similar device is attached to the collar in a manner well known in the art, so that the animal can be walked with control by the owner, or secured to a limited location to not run away. As an identifier, tags or similar identifying devices are often attached to the collar in a manner well known in the art so that the animal and its owner can be easily identified if the animal is lost. Yet, animal collars are largely dull and devoid of style, and it would be desirable to liven up the collar with an attractive associated garment.

Animal garments, such as bandannas, provide a decorative look when placed around an animal's neck. But since an animal—unlike a human being—is unaware of the presence of a bandanna on its neck and is certainly unconcerned about its loss, such a bandanna can in fact become easily detached from the animal unless it is properly secured.

U.S. Pat. Nos. 5,233,942; 5,467,743; 5,503,114; and 5,794,572 are examples of animal collars combined with other devices such as garments or identifiers. U.S. Pat. Nos. 5,025,508; 5,058,211; 5,381,559; 5,414,869; 5,608,914; and 5,867,833 include various scarves and/or bandannas for human use. But none of these patents discloses or suggests a suitable way to simultaneously provide added style to an animal collar using a bandanna while using the animal collar to secure the bandanna to the animal. Nor is a suitable method of manufacture disclosed or suggested.

OBJECTS OF THE INVENTION

The absence of style for typical animal collars coupled with the need to find a good way to secure a stylistic bandanna to an animal without loss makes it an object of the invention to attach a bandanna to an animal collar to introduce enhanced style for the collar, and simultaneously to make use of the securing properties of the animal collar to secure the bandanna against detachment from the animal and subsequent loss.

It is a further object to provide a simple method for manufacturing an animal collar and bandanna combination which satisfies the aforementioned objects of adding style to an animal collar while providing a secure attachment for a bandanna.

SUMMARY OF THE INVENTION

A triangular bandanna is slotted with at least two collar slots proximate one edge of the triangle. The edge proximate these slots, including the slots, is folded over upon the rest of the triangle and sewn or stitched into place. An animal collar is passed through the collar slots. When secured to an animal, the collar is enhanced in appearance by the bandanna, and the bandanna is securely affixed to the animal by the collar.

BRIEF DESCRIPTION OF THE DRAWING

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF THE PREFERRED EMBODIMENT OF THE INVENTION

The invention of the present disclosure is best illustrated and described by reference to the process through which it is manufactured. It is understood that both the resulting bandanna and bandanna/collar combination, as well as the method by which these are manufactured, are included within the scope of this disclosure and its associated claims.

Figure 1:
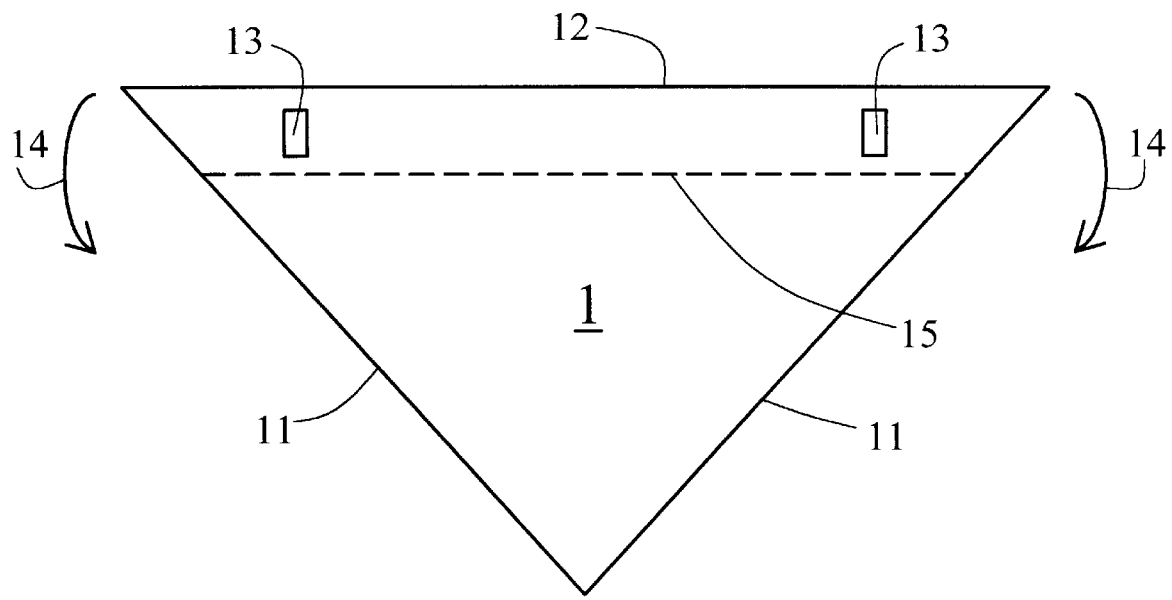
FIG. 1 illustrates a bandanna according to an embodiment of the invention, prior to folding and stitching.

FIG. 1 illustrates a bandanna in a preferred embodiment of the invention. Bandanna 1 is preferably shaped as an isosceles triangle, with two of its three edges being non-folded edges 11, preferably of substantially equal length, and the third, folded edge 12 being of any desired length, including as a special case, the same length as non-folded edges 11, thereby in this special case forming a substantially equilateral triangle.

Proximate third, folded edge 12 are at least two collar slots 13. These slots are cut into bandanna 1, substantially as shown, and must be of sufficient size such that an animal collar can later be passed therethrough (see FIG. 3). The slot 13 shapes, while shown herein as a rectangular, can be circular, ovular, or any other desired shape, so long as the slot size is large enough to later accommodate the animal collar.

Figure 2:
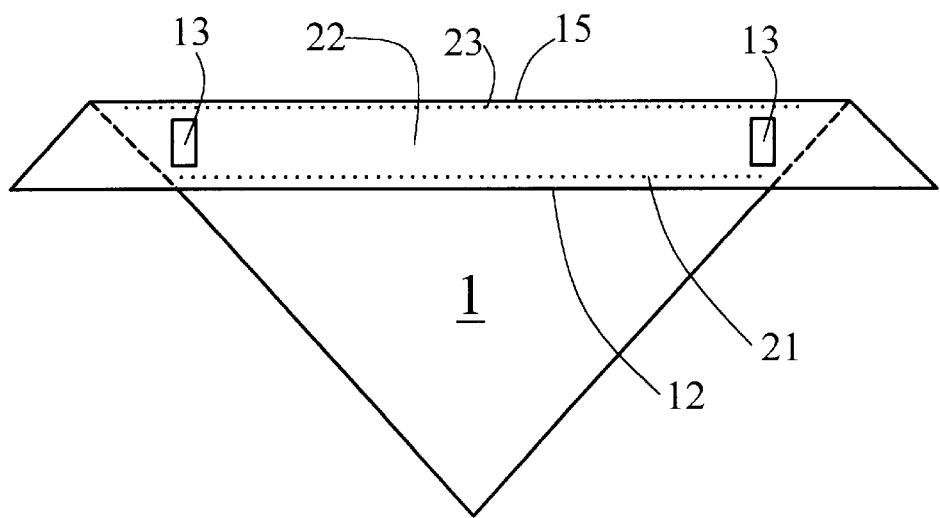
FIG. 2 illustrates the bandanna of FIG. 1 after folding and stitching.

Bandanna 1 is then folded 14 as shown along fold line 15, proximate and substantially parallel to third, folded edge 12, resulting in the configuration shown in FIG. 2. Third, folded edge 12 is then attached to the region of bandanna 1 to which it is proximate following the folding 14, substantially along attachment line 21. This attachment along line 21 can be achieved with sewing, stitching, gluing, Velcro®, snaps, or any other similar means known in the art for attaching one garment or garment section to another garment or garment section. The internal pass through region 22 between the two adjacently-folded sections of bandanna 1 (i.e., between sections of bandanna 1 between fold 15 and attachment 21) and between collar slots 13 is left unobstructed, so that a collar can later be passed therethrough. An optional protective attachment line 23 of, e.g., sewing or stitching may also be added to provide a more tailored look and to prevent wear along fold line 15 once collar 31 is added as described in FIGS. 3 and 4.

Figure 3:
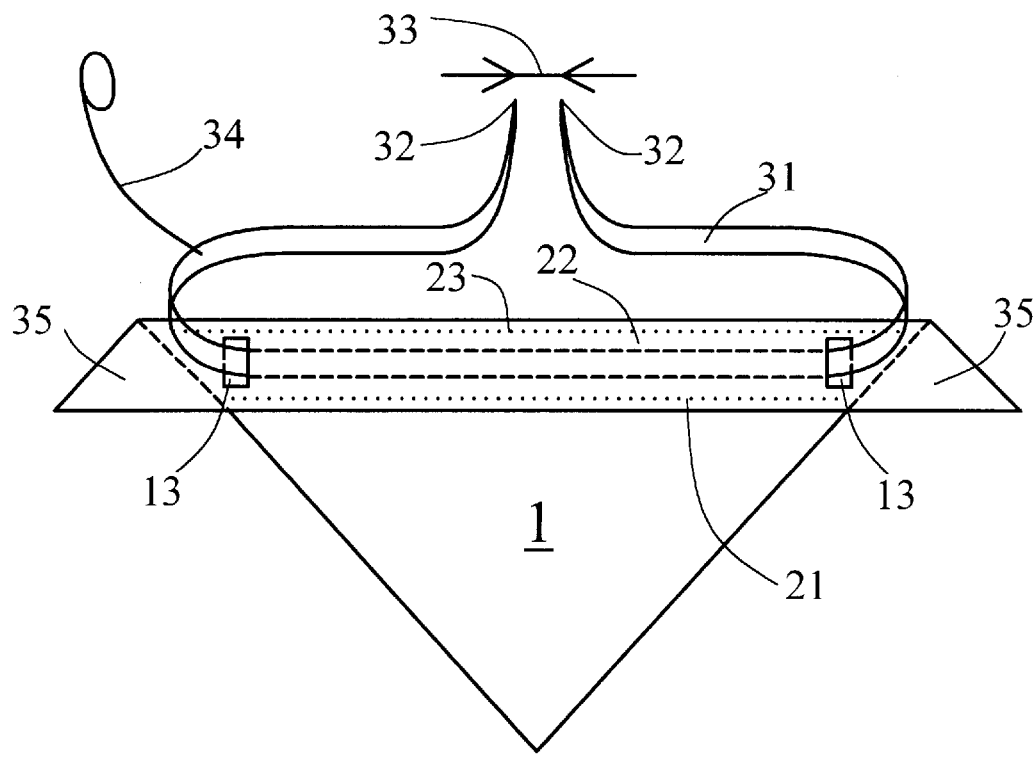
FIG. 3 illustrates the bandanna of FIG. 2 in combination with an animal collar for secure attachment to an animal.

Finally, in FIG. 3, animal collar 31 is passed through each of slots 13 as shown, and thus is mutually secured to and with bandanna 1 by virtue of its passage though internal pass through region 22. The collar and bandanna combination as shown is then attached to the subject animal by passing the two free ends 32 of collar 31 around the animal's neck, and attaching 33 collar ends 32 together using any collar end attachment means known in the art, such as, but not limited to, various forms of buckle and snap, or even by tying. This collar and bandanna combination can then be worn by the animal as is, thereby providing a decorative collar and securing the bandanna to the animal in a way that prevents loss. Or, an animal restraint 34 such as a leash may be attached to collar 31 in a well-known manner, so that the movement of the animal may be properly controlled. Tags, and similar identifiers (not shown) may also be attached to animal collar 31 at this point as well.

Figure 4:
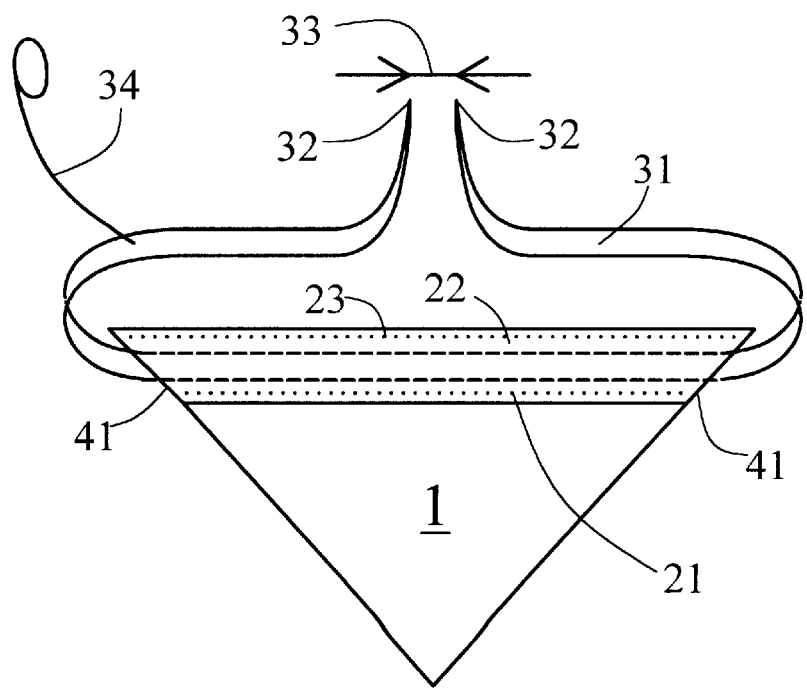
FIG. 4 illustrates an alternative embodiment of the bandanna and collar combination of FIG. 3.

In an alternative embodiment, slots 13 are eliminated entirely, and collar 31 is simply passed through the open ends 41 at the ends of internal pass through region 22, as shown in FIG. 4. In this embodiment, end triangular regions 35 near the ends of internal pass through region 22 may (optionally) be simply cut off, so as to not interfere with collar 31 proximate where it emerges from internal pass through region 22. These may also (optionally) be cut off in the embodiment of FIG. 3, if desired.

It is preferable, but not required, for the fabric comprising bandanna 1 to be constructed and/or printed such that the desired fabric design pattern appears on both sides of bandanna 1. For example, if the underlying fabric is printed with the desired pattern on only one side, then two fabric pieces can be cut into substantially congruent triangles and attached (e.g., stitched or sewn or glued) together back-to-back before beginning the process outlined in connection with FIG. 1. If the underlying fabric has a "finished" look on both sides to begin with, then this back-to-back stitching is not necessary. Again, this is simply an option, and a fabric finished on only one side (or not finished at all) can certainly be employed within the scope of this disclosure and its associated claims.

It is understood that the lengths of the edges of the triangle formed by bandanna 1 may be chosen at will within the scope of this disclosure and its associated claims. Similarly, any type of fabric, with any type of design, coloration, or other physical appearance, may be used for bandanna 1 within the scope of this disclosure and its associated claims. Similarly, collar 31 can be any type of standard animal collar, and can even be a rope or any other elongated device, so long as it is suitable for being secured around the neck of an animal, within the scope of this disclosure and its associated claims. It is also understood that in the slotted 13 embodiment of FIGS. 1 and 2, that slots 13 can be cut through bandanna 1 at any position suitable for passing a collar therethrough, and not only at the locations illustrated in FIGS. 1 and 2.

While only certain preferred features of the invention have been illustrated and described, many modifications and changes will occur to those skilled in the art. It is, therefore, to be understood that the appended claims are intended to cover all such modifications and changes as fall within the true spirit of the invention.

I claim:

1. An animal garment, comprising:
    a substantially-triangular bandanna comprising two non-folded edges and a third, folded edge;
    a fold proximate and substantially parallel to said third, folded edge; and
    an attachment between said third, folded edge and a region of said bandanna proximate thereto; wherein
    a substantially unobstructed internal pass-through region is defined between said fold and said attachment, and between sections of said bandanna between said fold and said attachment.

2. The animal garment of claim 1, further comprising at least two collar slots through said bandanna between said fold and said attachment.

3. The animal garment of claim 1, further comprising:
    an animal collar passing through said internal pass-through region and emerging from said internal pass-through region through open ends of said internal pass through region.

4. The animal garment of claim 3, further comprising:
    collar end attachment means for attaching free ends of said animal collar to one another around a neck of an animal and thereby securing said animal collar and said bandanna to said neck of said animal.

5. The animal garment of claim 1, further comprising a protective attachment line proximate and substantially parallel to said fold.

6. The animal garment of claim 1, said bandanna further comprising two substantially congruent, substantially triangular pieces of fabric attached together back-to-back.

7. A method of attaching an animal garment to an animal, comprising the steps of:
    passing an animal collar through an internal pass-through region defined between a fold proximate and substantially parallel to a folded edge of a substantially-triangular bandanna, and an attachment between said folded edge and a region of said bandanna proximate thereto; and
    attaching free ends of said animal collar to one another around a neck of an animal and thereby securing said animal collar and said bandanna to said neck of said animal.

8. The method of claim 7, comprising the further step of:
    emerging said animal collar from said internal pass-through region through open ends of said internal pass through region.

9. The method of claim 7, comprising the further steps of:
    providing at least two collar slots through said bandanna between said fold and said attachment; and
    emerging said animal collar from said internal pass-through region through said collar slots.

10. The method of claim 7, further comprising introducing a protective attachment line into said bandanna proximate and substantially parallel to said fold.

11. The method of claim 7, said bandanna further comprising two substantially congruent, substantially triangular pieces of fabric attached together back-to-back.

12. A method for producing an animal garment, comprising the steps of:
    providing a substantially-triangular bandanna comprising two non-folded edges and a third, folded edge;
    folding said bandanna along a fold proximate and substantially parallel to said third, folded edge; and
    attaching between said third, folded edge to a region of said bandanna proximate thereto; thereby
    defining a substantially unobstructed internal pass-through region between the fold and the attachment, and between sections of said bandanna between said fold and said attachment.

13. The method of claim 12, further comprising the step of:
    providing at least two collar slots through said bandanna between said third, folded edge fold and a line of said attachment.

14. The method of claim 12, further comprising the steps of:
   passing an animal collar through said internal pass-through region;
   emerging said animal collar from said internal pass-through region through open ends of said internal pass through region.

15. The method of claim 14, further comprising the step of:
   attaching free ends of said animal collar to one another around a neck of an animal and thereby securing said animal collar and said bandanna to said neck of said animal.

16. The method of claim 12, further comprising introducing a protective attachment line into said bandanna proximate and substantially parallel to said fold.

17. The method of claim 12, wherein said step of providing said substantially-triangular bandanna further comprises the step of attaching two substantially congruent, substantially triangular pieces of fabric together back-to-back.

* * * * *

UNITED STATES PATENT AND TRADEMARK OFFICE
CERTIFICATE OF CORRECTION

PATENT NO. : 6,209,140 B1
DATED : April 3, 2001
INVENTOR(S) : Lorraine A. Ebeling It is certified that error appears in the above-identified patent and that said Letters Patent is hereby corrected as shown below:

Delete Columns 1-6 and substitute therefore the attached Columns 1-6.

Signed and Sealed this

Eighteenth Day of November, 2003

JAMES E. ROGAN
*Director of the United States Patent and Trademark Office*

BANDANNA AND ANIMAL COLLAR COMBINATION AND METHOD OF MANUFACTURE

FIELD OF THE INVENTION

This invention relates generally to the field of animal collars, and particularly, to animal collars in combination with a bandanna-type garment.

BACKGROUND OF THE INVENTION

Animal collars are commonly used both to restrain and to identify the subject animal to which they are attached, such as a dog or a cat. As a restraint, a leash or similar device is attached to the collar in a manner well known in the art, so that the animal can be walked with control by the owner, or secured to a limited location to not run away. As an identifier, tags or similar identifying devices are often attached to the collar in a manner well known in the art so that the animal and its owner can be easily identified if the animal is lost. Yet, animal collars are largely dull and devoid of style, and it would be desirable to liven up the collar with an attractive associated garment.

Animal garments, such as bandannas, provide a decorative look when placed around an animal's neck. But since an animal—unlike a human being—is unaware of the presence of a bandanna on its neck and is certainly unconcerned about its loss, such a bandanna can in fact become easily detached from the animal unless it is properly secured.

U.S. Pat. Nos. 5,233,942; 5,467,743; 5,503,114; and 5,794,572 are examples of animal collars combined with other devices such as garments or identifiers. U.S. Pat. Nos. 5,025,508; 5,058,211; 5,381,559; 5,414,869; 5,608,914; and 5,867,833 include various scarves and/or bandannas for human use. But none of these patents discloses or suggests a suitable way to simultaneously provide added style to an animal collar using a bandanna while using the animal collar to secure the bandanna to the animal. Nor is a suitable method of manufacture disclosed or suggested.

OBJECTS OF THE INVENTION

The absence of style for typical animal collars coupled with the need to find a good way to secure a stylistic bandanna to an animal without loss makes it an object of the invention to attach a bandanna to an animal collar to introduce enhanced style for the collar, and simultaneously to make use of the securing properties of the animal collar to secure the bandanna against detachment from the animal and subsequent loss.

It is a further object to provide a simple method for manufacturing an animal collar and bandanna combination which satisfies the aforementioned objects of adding style to an animal collar while providing a secure attachment for a bandanna.

SUMMARY OF THE INVENTION

A triangular bandanna is slotted with at least two collar slots proximate one edge of the triangle. The edge proximate these slots, including the slots, is folded over upon the rest of the triangle and sewn or stitched into place. An animal collar is passed through the collar slots. When secured to an animal, the collar is enhanced in appearance by the bandanna, and the bandanna is securely affixed to the animal by the collar.

BRIEF DESCRIPTION OF THE DRAWING

The features of the invention believed to be novel are set forth in the appended claims. The invention, however, together with further objects and advantages thereof, may best be understood by reference to the following description taken in conjunction with the accompanying drawing(s) in which:

FIG. 1 illustrates a bandanna according to an embodiment of the invention, prior to folding and stitching.

FIG. 2 illustrates the bandanna of FIG. 1 after folding and stitching.

FIG. 3 illustrates the bandanna of FIG. 2 in combination with an animal collar for secure attachment to an animal.

FIG. 4 illustrates an alternative embodiment of the bandanna and collar combination of FIG. 3.

DETAILED DESCRIPTION OF THE PREFERRED EMBODIMENT OF THE INVENTION

The invention of the present disclosure is best illustrated and described by reference to the process through which it is manufactured. It is understood that both the resulting bandanna and bandanna/collar combination, as well as the method by which these are manufactured, are included within the scope of this disclosure and its associated claims.

FIG. 1 illustrates a bandanna in a preferred embodiment of the invention. Bandanna 1 is preferably shaped as an isosceles triangle, with two of its three edges being non-folded edges 11, preferably of substantially equal length, and the third, folded edge 12 being of any desired length, including as a special case, the same length as non-folded edges 11, thereby in this special case forming a substantially equilateral triangle.

Proximate third, folded edge 12 are at least two collar slots 13. These slots are cut into bandanna 1, substantially as shown, and must be of sufficient size such that an animal collar can later be passed therethrough (see FIG. 3). The slot 13 shapes, while shown herein as a rectangular, can be circular, ovular, or any other desired shape, so long as the slot size is large enough to later accommodate the animal collar.

Bandanna 1 is then folded 14 as shown along fold line 15, proximate and substantially parallel to third, folded edge 12, resulting in the configuration shown in FIG. 2. Third, folded edge 12 is then attached to the region of bandanna 1 to which it is proximate following the folding 14, substantially along attachment line 21. This attachment along line 21 can be achieved with sewing, stitching, gluing, Velcro®, snaps, or any other similar means known in the art for attaching one garment or garment section to another garment or garment section. The internal pass through region 22 between the two adjacently-folded sections of bandanna 1 (i.e., between sections of bandanna 1 between fold 15 and attachment 21) and between collar slots 13 is left unobstructed, so that a collar can later be passed therethrough. An optional protective attachment line 23 of, e.g., sewing or stitching may also be added to provide a more tailored look and to prevent wear along fold line 15 once collar 31 is added as described in FIGS. 3 and 4.

Finally, in FIG. 3, animal collar 31 is passed through each of slots 13 as shown, and thus is mutually secured to and with bandanna 1 by virtue of its passage though internal pass through region 22. The collar and bandanna combination as shown is then attached to the subject animal by passing the two free ends 32 of collar 31 around the animal's neck, and attaching 33 collar ends 32 together using any collar end attachment means known in the art, such as, but not limited to, various forms of buckle and snap, or even by tying. This collar and bandanna combination can then be worn by the animal as is, thereby providing a decorative collar and securing the bandanna to the animal in a way that prevents loss. Or, an animal restraint 34 such as a leash may be attached to collar 31 in a well-known manner, so that the movement of the animal may be properly controlled. Tags, and similar identifiers (not shown) may also be attached to animal collar 31 at this point as well.

In an alternative embodiment, slots 13 are eliminated entirely, and collar 31 is simply passed through the open ends 41 at the ends of internal pass through region 22, as shown in FIG. 4. In this embodiment, end triangular regions 35 near the ends of internal pass through region 22 may (optionally) be simply cut off, so as to not interfere with collar 31 proximate where it emerges from internal pass through region 22. These may also (optionally) be cut off in the embodiment of FIG. 3, if desired.

It is preferable, but not required, for the fabric comprising bandanna 1 to be constructed and/or printed such that the desired fabric design pattern appears on both sides of bandanna 1. For example, if the underlying fabric is printed with the desired pattern on only one side, then two fabric pieces can be cut into substantially congruent triangles and attached (e.g., stitched or sewn or glued) together back-to-back before beginning the process outlined in connection with FIG. 1. If the underlying fabric has a "finished" look on both sides to begin with, then this back-to-back stitching is not necessary. Again, this is simply an option, and a fabric finished on only one side (or not finished at all) can certainly be employed within the scope of this disclosure and its associated claims.

It is understood that the lengths of the edges of the triangle formed by bandanna 1 may be chosen at will within the scope of this disclosure and its associated claims. Similarly, any type of fabric, with any type of design, coloration, or other physical appearance, may be used for bandanna 1 within the scope of this disclosure and its associated claims. Similarly, collar 31 can be any type of standard animal collar, and can even be a rope or any other elongated device, so long as it is suitable for being secured around the neck of an animal, within the scope of this disclosure and its associated claims. It is also understood that in the slotted 13 embodiment of FIGS. 1 and 2, that slots 13 can be cut through bandanna 1 at any position suitable for passing a collar therethrough, and not only at the locations illustrated in FIGS. 1 and 2.

While only certain preferred features of the invention have been illustrated and described, many modifications and changes will occur to those skilled in the art. It is, therefore, to be understood that the appended claims are intended to cover all such modifications and changes as fall within the true spirit of the invention.

I claim:

1. A combination animal garment, collar and restraining apparatus, comprising:

a substantially-triangular bandanna comprising two non-folded edges and a third, folded edge;

a fold proximate and substantially parallel to said third, folded edge;

an attachment between said third, folded edge and a region of said bandanna proximate thereto, thereby defining a substantially unobstructed internal pass-through region between said fold and said attachment;

an animal collar passing through said internal pass-through region and emerging from said internal pass-through region; and an animal restraint wholly separate and distinct from said bandanna attached to said animal collar at a first, attached end of said animal restraint; wherein:

said animal collar, passes through said internal pass through region and, securely maintains said bandanna around a neck of an animal by securing around said neck of said animal; and said animal restraint is restrained at a second, unattached end thereof, said animal restraint in combination with said animal collar restrains said animal and said animal collar simultaneously securely maintains said bandanna around said neck of said animal; whereby:

said bandanna is simultaneously provided and secured to said animal in a way that will not easily detach from said animal, and said animal can be restrained using an animal restraint attached to the same said collar that secures said bandanna at the same time said bandanna is securely maintained around said neck of said animal.

2. The apparatus of claim 1, further comprising at least two collar slots through said bandanna between said fold and said attachment; wherein:

said animal collar emerges from said internal pass-through region through said collar slots.

3. The apparatus of claim 1 wherein:

said animal collar emerges from said internal pass-through region through open ends of said internal pass through region.

4. The apparatus of claim 1, further comprising:

collar end attachment means for attaching free ends of said animal collar to one another around said neck of said animal and thereby securing said animal collar and said bandanna to said neck of said animal.

5. The apparatus of claim 1, further comprising a protective attachment line proximate and substantially parallel to said fold.

6. The apparatus of claim 1, said bandanna further comprising two substantially congruent, substantially triangular pieces of fabric attached together back-to-back.

7. A method of securing an animal garment to, and simultaneously restraining, an animal, comprising the steps of:

passing an animal collar through an internal pass-through region defined between a fold proximate and substantially parallel to a folded edge of a substantially-triangular bandanna, and an attachment between said folded edge and a region of said bandanna proximate thereto;

emerging said animal collar from said internal pass-through region;

attaching free ends of said animal collar to one another around a neck of an animal and thereby securing said animal collar and said bandanna to said neck of said animal; and attaching an animal restraint wholly separate and distinct from said bandanna to said animal collar at a first, attached end of said animal restraint; thereby:

securely maintaining said bandanna around said neck of said animal by said animal collar passing through said internal pass-through region while said animal collar is secured around said neck of said animal; and simultaneously restraining said animal while said animal restraint is restrained at a second, unattached end thereof, using said animal restraint in combination with said animal collar, without disturbing said animal collar securely maintaining said bandanna around said neck of said animal; whereby:

said bandanna is simultaneously provided and secured to said animal in a way that will not easily detach from said animal, and said animal can be restrained using an animal restraint attached to the same said collar that secures said bandanna at the same time said bandanna is securely maintained around said neck of said animal.

8. The method of claim 7, comprising the further step of:

emerging said animal collar from said internal pass-through region through open ends of said internal pass through region.

9. The method of claim 7, comprising the further steps of:

providing at least two collar slots through said bandanna between said fold and said attachment; and emerging said animal collar from said internal pass-through region through said collar slots.

10. The method of claim 7, further comprising introducing a protective attachment line into said bandanna proximate and substantially parallel to said fold.

11. The method of claim 7, said bandanna further comprising two substantially congruent, substantially triangular pieces of fabric attached together back-to-back.

12. A method for producing a combination animal garment, collar, and restraining apparatus, comprising the steps of:

providing a substantially-triangular bandanna comprising two non-folded edges and a third, folded edge;

folding said bandanna along a fold proximate and substantially parallel to said third, folded edge; and attaching said third, folded edge to a region of said bandanna proximate thereto, thereby defining a substantially unobstructed internal pass-through region between the fold and the attachment;

passing an animal collar through said internal pass-through region;

emerging said animal collar from said internal pass-through region through open ends of said internal pass through region; and attaching an animal restraint wholly separate and distinct from said bandanna to said animal collar at a first, attached end of said animal restraint; wherein:

while said animal collar is secured around a neck of an animal, said animal collar, by passing through said internal pass-through region, securely maintains said bandanna around said neck of said animal; and while said animal restraint is restrained at a second, unattached end thereof, said animal restraint in combination with said animal collar restrains said animal simultaneously with, and without disturbing, said animal collar securely maintaining said bandanna around said neck of said animal; whereby:

said bandanna is simultaneously provided and secured to said animal in a way that will not easily detach from said animal, and said animal can be restrained using an animal restraint attached to the same said collar that secures said bandanna at the same time said bandanna is securely maintained around said neck or said animal.

13. The method of claim 2, further comprising the steps of:

providing at least two collar slots through said bandanna between said third, folded edge fold and a line of said attachment; and emerging said animal collar from said internal pass-through region through said collar slots.

14. The method of claim 12, further comprising the step of:

emerging said animal collar from said internal pass-through region through open ends of raid internal pass through region.

15. The method of claim 4, further comprising the step of:

attaching free ends of said animal collar to one another around said neck of said animal and thereby securing said animal collar and said bandanna to said neck of said animal.

16. The method of claim 12, further comprising introducing a protective attachment line into said bandanna proximate and substantially parallel to said fold.

17. The method of claim 12, wherein said step of providing said substantially-triangular bandanna further comprises the step of attaching two substantially congruent, substantially triangular pieces of fabric together back to back.

* * * * *